US012038258B2

United States Patent
Yonezawa

(10) Patent No.: US 12,038,258 B2
(45) Date of Patent: Jul. 16, 2024

(54) IGNITER ASSEMBLY AND METHOD FOR ASSEMBLING IGNITER ASSEMBLY

(71) Applicant: DAICEL CORPORATION, Osaka (JP)

(72) Inventor: Kenichi Yonezawa, Tokyo (JP)

(73) Assignee: DAICEL CORPORATION, Tokyo (JP)

( * ) Notice: Subject to any disclaimer, the term of this patent is extended or adjusted under 35 U.S.C. 154(b) by 169 days.

(21) Appl. No.: 17/697,385

(22) Filed: Mar. 17, 2022

(65) Prior Publication Data

US 2022/0205765 A1    Jun. 30, 2022

Related U.S. Application Data

(63) Continuation of application No. PCT/JP2020/033179, filed on Sep. 2, 2020.

(30) Foreign Application Priority Data

Sep. 20, 2019  (JP) ................................ 2019-171463

(51) Int. Cl.
  *F42B 3/103*    (2006.01)
  *B60R 21/26*    (2011.01)
  *B60R 21/264*   (2006.01)

(52) U.S. Cl.
  CPC .... *F42B 3/103* (2013.01); *B60R 2021/26029* (2013.01); *B60R 21/2644* (2013.01)

(58) Field of Classification Search
  CPC .............. B60R 21/264; B60R 21/2644; B60R 2021/26029; B60R 2021/26076;
  (Continued)

(56) References Cited

U.S. PATENT DOCUMENTS 5,269,560 A  *  12/1993  O'Loughlin ........ B60R 21/2644
                                                280/736
5,273,722 A  *  12/1993  Hogenauer ......... B60R 21/2644
                                                422/165
(Continued)

FOREIGN PATENT DOCUMENTS

DE     602006000920 T2    8/2008
EP         1227294 A1 *   7/2002    ......... B60R 21/2644
(Continued)

OTHER PUBLICATIONS

International Search Report dated Nov. 2, 2020, issued in counterpart International application No. PCT/JP2020/033179, with English translation. (5 pages).
(Continued)

*Primary Examiner* — Laura Freedman
(74) *Attorney, Agent, or Firm* — WHDA, LLP

(57) ABSTRACT

An igniter assembly includes an igniter of an electric ignition type including: an ignition portion including an igniting agent; a holding portion made of resin and covering at least a portion of the ignition portion and holding the ignition portion; and an electro-conductive pin configured to energize the ignition portion, and also includes an igniter collar made of metal and to which the igniter is attached. The igniter collar includes a fixing portion surrounding the holding portion to fix it. The holding portion includes a protrusion portion formed continuously around a periphery of the holding portion and formed integrally with the holding portion. The protrusion portion is press-attached to the fixing portion in a state where the holding portion is fixed to the fixing portion.

17 Claims, 13 Drawing Sheets

(58) Field of Classification Search
CPC . B60R 2021/26082; B60R 2021/26088; F42B 3/103; F42B 3/12; F16B 4/00
See application file for complete search history.

(56) References Cited

U.S. PATENT DOCUMENTS

| | | | | |
|---|---|---|---|---|
| 5,487,559 | A * | 1/1996 | Headley | B60R 21/0173 280/741 |
| 6,053,531 | A | 4/2000 | Katsuda et al. | |
| 6,718,884 | B1 * | 4/2004 | Yabuta | F42B 3/103 280/741 |
| 6,820,556 | B1 * | 11/2004 | Oda | F42B 3/195 102/202.7 |
| 6,823,796 | B1 * | 11/2004 | Amano | F42B 3/103 102/530 |
| 6,979,021 | B2 * | 12/2005 | Young | F42B 3/103 280/741 |
| 7,125,041 | B2 * | 10/2006 | Kato | B60R 22/4628 280/736 |
| 7,591,483 | B2 * | 9/2009 | Nakayasu | B60R 21/2644 280/736 |
| 7,614,344 | B2 * | 11/2009 | Oda | F42B 3/198 102/202.9 |
| 8,176,851 | B2 * | 5/2012 | Kodama | F42B 3/103 280/741 |
| 8,573,130 | B2 * | 11/2013 | Chen | B60R 21/272 280/736 |
| 9,199,603 | B2 * | 12/2015 | Ohsugi | B60R 21/264 |
| 10,060,452 | B2 * | 8/2018 | Yamada | F15B 15/19 |
| 10,589,709 | B2 * | 3/2020 | Bierwirth | B60R 21/2644 |
| 11,685,335 | B2 * | 6/2023 | Noda | B60R 21/2644 280/741 |
| 2004/0232679 | A1 * | 11/2004 | Kubo | F42B 3/103 280/741 |
| 2004/0250542 | A1 * | 12/2004 | Nishina | F42B 3/103 60/632 |
| 2004/0251667 | A1 * | 12/2004 | Harada | F42B 3/107 280/736 |
| 2006/0207459 | A1 | 9/2006 | Nishina | |
| 2008/0067791 | A1 | 3/2008 | Yamazaki | |
| 2010/0236439 | A1 | 9/2010 | Yamazaki | |

FOREIGN PATENT DOCUMENTS

| | | | |
|---|---|---|---|
| JP | H11-059314 A | 3/1999 | |
| JP | 2004293835 A * | 10/2004 | F42B 3/103 |
| JP | 3134281 U | 8/2007 | |
| JP | 2007-225160 A | 9/2007 | |
| JP | 2008-062685 A | 3/2008 | |
| JP | 2018-158690 A | 10/2018 | |

OTHER PUBLICATIONS

Written Opinion dated Nov. 2, 2020, issued in counterpart International application No. PCT/JP2020/033179, with English translation. (6 pages).
English transation of Office Action dated Feb. 10, 2023 issued in counterpart CN application No. 2020800659050. (10 pages).
English Translation of Office Action dated Nov. 11, 2022, issued in counterpart DE application No. 112020004400.9. (6 pages).

* cited by examiner

IGNITER ASSEMBLY AND METHOD FOR ASSEMBLING IGNITER ASSEMBLY

TECHNICAL FIELD

The present disclosure relates to an igniter assembly including an igniter of an electric ignition type attached to an igniter collar, and also relates to a method for assembling an igniter assembly.

BACKGROUND ART

An igniter assembly including an igniter of an electric ignition type is assembled in a manner such that this igniter is fixed to an igniter collar made of metal. In addition, the igniter assembly is attached to a safety device such as an airbag gas generator through an igniter collar, and is widely used. For such a safety device, it is important to ensure that the igniter is actuated when required and that the device in which the igniter is incorporated securely functions. In a case where the igniter assembly has a poor sealing property between the igniter and the igniter collar, atmospheric moisture enters the device from the outside of the igniter assembly through a small gap (for example, a gap between the igniter and the igniter collar) in the igniter assembly, which may cause a defect. In this respect, Patent Document 1 discloses a technique of improving the sealing property in an igniter assembly, in which a groove is formed in an inner circumferential surface of a tubular collar member surrounding the igniter, and the igniter is attached to the tubular collar member in a state where a seal member is fitted into this groove and is pressed with the igniter.

In addition, Patent Document 2 describes an igniter assembly that includes an igniter main body including an ignition section and a resin portion surrounding a periphery of the ignition section, and also includes an igniter collar to which the igniter main body is fitted and fixed. In the igniter assembly, a protrusion formed on the inner peripheral portion of the igniter collar is bitten into the resin portion, whereby the sealing property in the igniter assembly improves.

CITATION LIST

Patent Documents

Patent Document 1: JP H11-59314 A
Patent Document 2: JP 2007-225160 A

SUMMARY OF INVENTION

Technical Problem

In a case of using a seal member to improve the sealing property in the igniter assembly, the number of parts in the igniter assembly increases. The increase in the number of parts is not preferable from the viewpoint of parts management. The number of steps in assembling also increases.

Furthermore, once the protrusion formed on the inner peripheral portion of the igniter collar made of metal is bitten into the resin portion, the portion of the resin portion where the protrusion is bitten is deformed and is recessed. If the igniter is re-attached to the igniter collar, the recess of the resin portion causes a deterioration of the sealing property. Thus, the attachment process for the igniter collar cannot be redone. Since the attachment process for the igniter collar cannot be redone in this manner, the igniter collar and the igniter are required to be highly accurately aligned with each other. This makes it difficult to perform the attachment process for the igniter collar.

In view of the problem described above, an object of the present disclosure is to provide a technique that improves a sealing property in an igniter assembly without increasing the number of parts while making it easy to perform assembly.

Solution to Problem

To solve the problem described above, in the present disclosure, a holding portion made of resin includes a protrusion portion, and the protrusion portion is press-attached to a fixing portion of an igniter collar. This makes it possible to improve a sealing property in an igniter assembly without increasing the number of parts while making it easy to perform assembly.

Specifically, the present disclosure provides an igniter assembly, which includes an igniter of an electric ignition type including an ignition portion including an igniting agent; a holding portion made of resin, covering at least a portion of a periphery of the ignition portion and holding the ignition portion and an electro-conductive pin configured to energize the ignition portion, and also includes an igniter collar made of metal and to which the igniter is attached, in which the igniter collar includes a fixing portion surrounding the holding portion to fix the holding portion, the holding portion includes a protrusion portion formed continuously around a periphery thereof and formed integrally with the holding portion, and the protrusion portion is press-attached at the fixing portion in a state where the holding portion is fixed to the fixing portion.

With the igniter assembly described above, the protrusion portion included in the holding portion made of resin is caused to be press-attached to the fixing portion of the igniter collar made of metal. This makes it possible to improve the sealing property between the igniter and the igniter collar to prevent moisture from entering from the outside. In addition, the protrusion portion is made of resin and is formed integrally with the holding portion. This allows improvement of the sealing property of the igniter assembly without using a seal member such as a gasket. Furthermore, there may be a case where a process of fixing the holding portion of the igniter to the fixing portion of the igniter collar needs to be performed again. In such a case, even if the holding portion is once detached from the fixing portion, the protrusion portion can be press-attached to the fixing portion again at the time of re-attaching the holding portion to the fixing portion. Thus, even if this process is performed again, the sealing property in the igniter assembly can be secured. In this manner, with this igniter assembly, the sealing property can be improved without increasing the number of parts while making it easy to perform assembly.

In the igniter assembly described above, in a state where the holding portion is fixed to the fixing portion, the protrusion portion may be pressed against the fixing portion and be deformed to be air-tightly brought into close contact with the fixing portion. With a tip end of the protrusion portion being crushed and being deformed to be air-tightly brought into close contact with the fixing portion, thereby further improving the sealing property between the igniter and the igniter collar.

The igniter assembly described above may be configured such that the ignition portion includes a tubular peripheral wall portion, a lid portion closing one end of the tubular peripheral wall portion, and an accommodating space formed with the tubular peripheral wall portion and the lid portion and accommodating therein the igniting agent, the lid portion is disposed in a manner such that the lid portion is located at a side toward which a combustion product of the igniting agent is discharged when the igniter is actuated, the holding portion includes: an inclined portion inclined downward of the igniter assembly and surrounding at least a portion of a periphery of the tubular peripheral wall portion and crimped at a tip end portion of the fixing portion, an opposing portion opposed to a bottom surface portion of the fixing portion, and a peripheral wall portion connecting the inclined portion and the opposing portion, the protrusion portion is formed on at least any one of the inclined portion, the peripheral wall portion, or the opposing portion, and the fixing portion surrounds at least a portion of the inclined portion, the peripheral wall portion, and the opposing portion to fix the holding portion.

Here, the protrusion portion may be formed on at least any one of the inclined portion, the peripheral wall portion, or the opposing portion of the holding portion. In a state where the holding portion is fixed to the fixing portion, the protrusion portion may be formed at a position that allows the protrusion portion to be press-attached to the fixing portion of the igniter collar. With the protrusion portion being press-attached to the fixing portion, the sealing property of the igniter assembly can be improved, and moisture can be prevented from entering from the outside.

The igniter assembly may be configured such that a plurality of the protrusion portions are formed at the holding portion, the plurality of the protrusion portions include a first protrusion portion and a second protrusion portion, and the first protrusion portion and the second protrusion portion are formed concentrically with respect to a center axis of the ignition portion and have different heights protruding from the holding portion. The first protrusion portion and the second protrusion portion formed concentrically with respect to the center axis of the ignition portion are formed such that the heights of these portions differ from each other. Thus, even in a case where a process of fixing the holding portion of the igniter to the fixing portion of the igniter collar needs to be redone, the lower protrusion portion is not brought into contact with the fixing portion or only the tip end thereof is brought into contact with the fixing portion at the time of fixing the holding portion to the fixing portion for the first time while the higher protrusion portion is press-attached and is deformed in a crushed manner. This makes it possible to maintain the lower protrusion portion not to be deformed to a degree that it completely crushes. Thus, at the time of fixing the holding portion at the fixing portion again, the protrusion portion that has not yet be deformed can reliably be press-attached to the fixing portion and deformed. With this configuration, the igniter assembly described above can secure the sealing property even if the process of fixing the holding portion to the fixing portion is redone.

The igniter assembly may be configured such that a cross-sectional shape of the protrusion portion in a protruding direction from a surface of the holding portion is a rectangle shape, a trapezoid shape, or a semicircular shape, and a width of the cross-sectional shape is greater than a height of protrusion from the front surface. In this manner, the cross-sectional shape of the protrusion portion may be any one of the rectangle shape, the trapezoid shape, or the semicircular shape. Furthermore, the cross-sectional shape of the protrusion portion may be a triangle shape or other polygonal shapes.

The igniter assembly described above may be configured such that the fixing portion includes a groove portion formed at a position corresponding to the protrusion portion, and in a case where the protrusion portion is press-attached to the fixing portion, the protrusion portion is fitted into the groove portion and is deformed into a shape corresponding to a shape of the groove portion. By causing the protrusion portion to be fitted into the groove portion and be deformed into a shape corresponding to the groove portion, thereby further improving the sealing property between the igniter and the igniter collar.

Here, the present disclosure can be considered from an aspect of a method for assembling an igniter assembly. That is, the present disclosure may provide a method for assembling an igniter assembly in which an igniter of an electric ignition type is attached to an igniter collar made of metal, the method including: preparing the igniter including an ignition portion including an igniting agent, a holding portion made of resin, covering at least a portion of a periphery of the ignition portion and hold the ignition portion, and an electro-conductive pin configured to energize the ignition portion; and preparing the igniter collar including a fixing portion surrounding the holding portion to fix it, in which the holding portion includes a protrusion portion formed continuously around a periphery thereof and formed integrally with the holding portion, and the method for assembling an igniter assembly further includes fixing the holding portion to the fixing portion in a state where the protrusion portion is press-attached to the fixing portion.

Advantageous Effects of Invention

With the technique according to the present disclosure, the sealing property in the igniter assembly can be improved without increasing the number of parts while making it easy to perform assembly.

DESCRIPTION OF EMBODIMENTS

Below, with reference to the drawings, an igniter assembly and a method for assembling an igniter assembly according to embodiment of the present disclosure will be described. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiments and is limited only by the claims.

First Embodiment

Figure 1:
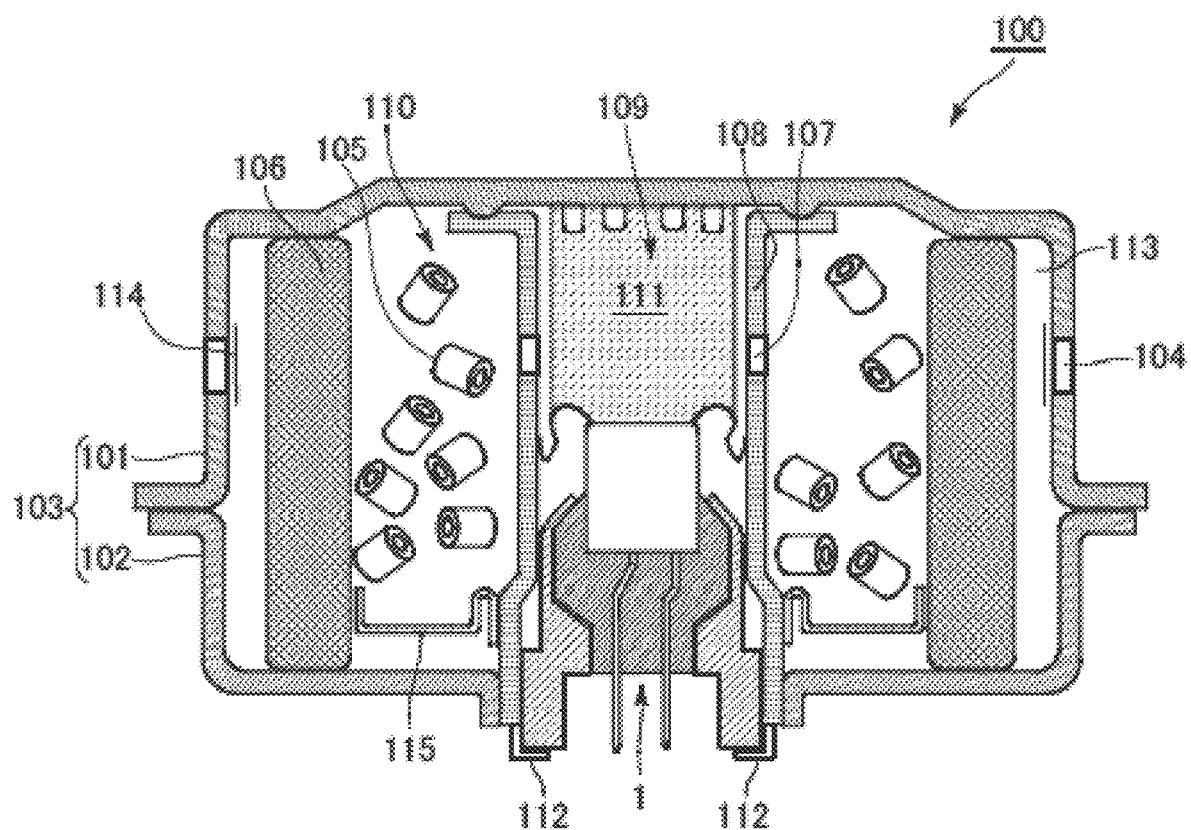
FIG. 1 is a diagram illustrating a schematic configuration of a gas generator including an igniter assembly according to a first embodiment.

FIG. 1 is an axial cross-sectional view of an airbag gas generator (hereinafter, referred to as a "gas generator") 100 using an igniter assembly 1 according to a first embodiment. Note that the gas generator 100 is not limited to a gas generator used for an airbag, and may have a known shape suitable for a seatbelt pre-tensioner or a curtain airbag, or may have a known shape that is used for various types of actuators or the like. The gas generator 100 includes an upper shell 101 and a lower shell 102. The upper shell 101 and the lower shell 102 are made of metal and have a bottomed substantially cylindrical shape. Furthermore, a plurality of gas release openings 104 are formed side by side in a circumferential direction in the upper shell 101. In the gas generator 100, the upper shell 101 and the lower shell 102 are joined in a state where open ends of these shells are opposed to each other to form a housing 103 having a short tubular shape with both ends in an axial direction being closed. The igniter assembly 1 is disposed within this housing 103. Note that, before the igniter assembly 1 is actuated, the gas release opening 104 is closed from the inside of the housing 103 by aluminum sealing tape 114. The igniter assembly 1, which will be described in detail later, generates combustion gas to inflate, for example, an airbag (bag), with an igniter 2 included in the igniter assembly 1 (see FIG. 2) being actuated to cause ignition and combustion of a gas generating agent 105 with which the housing 103 is filled.

In the gas generator 100, an inner tubular member 108 including a peripheral wall having a plurality of flame transferring holes 107 is arranged in the center of the housing 103. In addition, a space 109 for accommodating the igniter assembly 1 and the transfer charge 111 is formed inside the inner tubular member 108. Furthermore, a combustion chamber 110 for accommodating the gas generating agent 105 is formed outside the inner tubular member 108 in a radial direction. Note that, in the combustion chamber 110, the gas generating agent 105 is supported by an under plate 115 formed in a substantially ring-like shape. As the transfer charge 111, a gas generating agent having favorable ignitability and a combustion temperature higher than that of the gas generating agent 105 may be used. Preferably, the combustion temperature of the transfer charge 111 ranges from 1,700° C. to 3,000° C. As for such a transfer charge 111, a known material including, for example, nitroguanidine (34 wt. %) and strontium nitrate (56 wt. %) can be used. Alternatively, known black powder (boron saltpeter) may be used as the transfer charge. Furthermore, as for the gas generating agent 105, a gas generating agent having a relatively low combustion temperature can be used. It is desirable that the combustion temperature of the gas generating agent 105 falls, for example, in a range from 1000° C. to 1700° C. A known material containing guanidine nitrate (41 wt. %), basic copper nitrate (49 wt. %), a binder and an additive can be used.

In addition, the igniter assembly 1 is fixed at the lower shell 102 side of the inner tubular member 108. The igniter assembly 1 can be fixed to the inner tubular member 108 in a manner such that the open end portion 112 side of the inner tubular member 108 is crimped to fix an igniter collar 6 (see FIG. 2) of the igniter assembly 1. Furthermore, the inner tubular member 108 is joined by welding or the like to the lower shell 102 in the vicinity of the open end portion 112 at a side where the igniter assembly 1 is accommodated.

The gas generating agent 105 is accommodated in the combustion chamber 110, and a filter 106 is arranged on the outside thereof. The filter 106 collects a combustion residue contained in combustion gas generated by combustion of the gas generating agent 105, and cools the combustion gas. The filter 106 is formed in a tubular shape using a laminated metal mesh or the like, and has an outer circumferential surface arranged to face an inner circumferential surface of the housing 103. A gap 113 that is to serve as a gas flow path is formed between the outer peripheral surface of the filter 106 and the inner circumferential surface of the housing 103. This makes it possible to utilize the entire surface of the filter 106.

In the gas generator 100 configured in this manner, upon actuation of the igniter assembly 1, the transfer charge 111 disposed in a vicinity thereof is ignited and combusts. Flame generated by the ignition and combustion is discharged into the combustion chamber 110 through the flame transferring holes 107 formed in the inner tubular member 108. With this flame, the gas generating agent 105 in the combustion chamber 110 is ignited and combusts, and thus combustion gas is generated. The combustion gas is cleaned and cooled while passing through the filter 106, breaks through the sealing tape 114 closing the gas release opening 104, and then discharged to the outside through the gas release opening 104.

Figure 2:
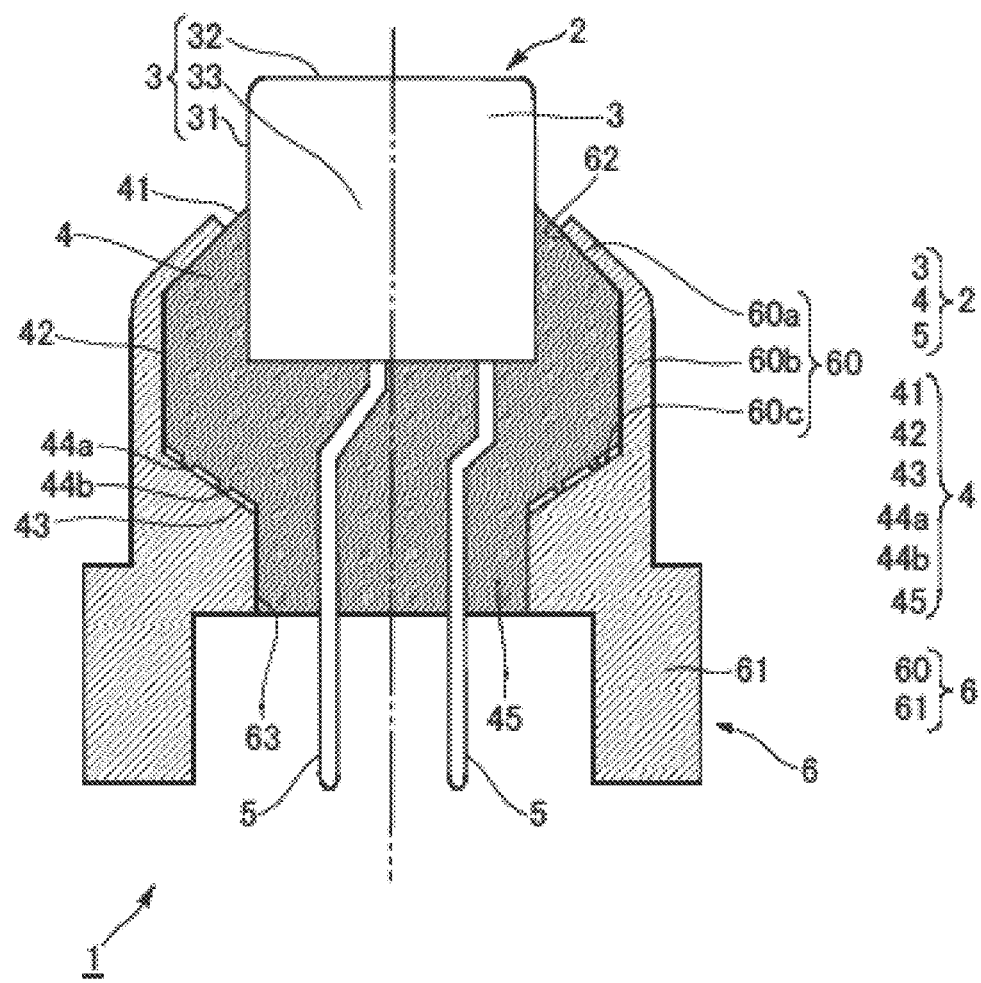
FIG. 2 is a diagram illustrating a schematic configuration of the igniter assembly according to the first embodiment.

Next, the igniter assembly 1 will be described with reference to FIG. 2. FIG. 2 is an axial cross-sectional view of the igniter assembly 1 according to the present embodiment. The igniter assembly 1 includes the igniter 2. The igniter 2 includes an ignition portion 3 including an igniting agent, a holding portion 4 holding the ignition portion 3, and an electro-conductive pin 5 configured to energize the ignition portion 3. The igniter 2 is of an electric igniting type configured to cause an igniting agent within the ignition portion 3 to combust using ignition current supplied from the electro-conductive pin 5.

The ignition portion 3 has a cup-body shape. The ignition portion 3 includes a tubular peripheral wall portion 31, a lid portion 32 closing one end of the tubular peripheral wall portion 31, and an accommodating space 33 formed with the tubular peripheral wall portion 31 and the lid portion 32 and accommodating therein an igniting agent. The lid portion 32 is disposed in a manner such that the lid portion is located at a side toward which a combustion product of the igniting agent is discharged when the igniter 2 is actuated. For example, the igniter assembly 1 is disposed within the housing 103 in a manner such that the lid portion 32 faces a filling position of the transfer charge 111, as illustrated in FIG. 1. With this configuration, in a case where the igniter 2 of the igniter assembly 1 is actuated, the combustion product from the igniting agent can be discharged toward the transfer charge 111 to ignite and burn the transfer charge 111. Here, the center axis direction of the igniter assembly 1 is referred to as a vertical direction of the igniter assembly. The lid portion 32 side is referred to as an upper side (upward of the paper surface of FIG. 2) of the igniter assembly 1. The opposite side of this side is referred to as a lower side (downward of the paper surface of FIG. 2) of the igniter assembly 1. In FIG. 2, the center axis of the igniter assembly 1 is indicated by two dot-dash lines. Note that the center axis of the igniter assembly 1 matches the center axes of the ignition portion 3 and the igniter collar 6 (fixing portion 60) that will be described later.

The holding portion 4 is made of resin, and surrounds a portion of the ignition portion 3 to hold the ignition portion 3. During the manufacturing process for the igniter 2, the holding portion 4 is formed through injection molding using a resin material. As the resin material for forming the holding portion 4, it is possible to preferably use a resin material having, after curing, excellent heat resistance, durability, corrosion resistance, and the like. Examples of such resin material include: thermoplastic resins such as polybutylene terephthalate resin, polyethylene terephthalate resin, polyamide resin, polypropylene sulfide resin, and polypropylene oxide resin; and thermosetting resins such as epoxy resin. Note that the holding portion 4 may be formed in a manner such that the holding portion 4 surrounds the entire periphery of the ignition portion 3.

A pair of electro-conductive pins 5 are electrically insulated from each other, and a bridge wire (not illustrated) is bridge-connected between the pins within the accommodating space 33 of the ignition portion 3. The igniting agent accommodated in the accommodating space 33 of the ignition portion 3 is in contact with the bridge wire (not illustrated) bridge-connected between the electro-conductive pins 5. The igniting agent is ignited and burnt by the heat generated from the bridge wire. This generates a combustion product. In this manner, the igniter 2 causes the igniting agent to combust, and the combustion product of this is discharged.

In addition, the igniter assembly 1 includes the igniter collar 6 to which the igniter 2 is attached. The igniter collar 6 includes a fixing portion 60 made of metal and surrounding the holding portion 4 to fix the holding portion 4, and also includes an attachment portion 61 crimped with the open end portion 112 of the inner tubular member 108 at the time of being attached to the gas generator 100 illustrated in FIG. 1. The attachment portion 61 is formed in a manner such that the diameter of this portion is slightly less than the diameter of the space 109 of the gas generator 100 to a degree that the attachment portion 61 fits into the space 109, and the attachment portion 61 is fitted into the space 109. Below, a mode in which the igniter 2 is attached to the igniter collar 6 will be described.

An opening 62 is formed in an upper-side end portion of the fixing portion 60 in the axial direction. An opening 63 is formed in a lower-side end portion in the axial direction. The fixing portion 60 has a tubular shape having both ends open, and includes a tip end portion 60a, a central portion 60b, and a bottom surface portion 60c. The bottom surface portion 60c supports the holding portion 4 from below, and is disposed at the lowermost portion of the fixing portion 60. The central portion 60b extends upward from the bottom surface portion 60c in the axial direction of the igniter assembly 1, and is connected to the tip end portion 60a disposed at the upper end side. At the time of manufacturing the igniter collar 6, the tip end portion 60a extends from the central portion 60b in a straight manner. During a process of fixing the igniter 2 at the igniter collar 6, the tip end portion 60a is bent inward to crimp the holding portion 4.

The holding portion 4 includes an inclined portion 41 inclined downward of the igniter assembly 1 and surrounding a portion of a periphery of the tubular peripheral wall portion 31, an opposing portion 43 opposed to the bottom surface portion 60c of the fixing portion 60, and a peripheral wall portion 42 connecting the inclined portion 41 and the opposing portion 43. The tip end portion 60a is bent toward the inner side of the igniter collar 6 until the tip end portion 60a is press-attached to the inclined portion 41, whereby the holding portion 4 is crimped with the tip end portion 60a. Since the inclined portion 41 is inclined downward, the bending angle of the tip end portion 60a from the central portion 60b can be made an obtuse angle, which facilitates crimping with the tip end portion 60a. Note that the inclined portion 41 is made of resin and is formed integrally with the holding portion 4, and the inclined portion 41 may be formed in a manner such that the inclined portion 41 covers up to a periphery of the upper end of the tubular peripheral wall portion 31 or covers up to the lid portion 32.

The bottom surface portion 60c supports the igniter 2 fitted from the opening 62 side. In the present embodiment, the bottom surface portion 60c is inclined downward toward the inside of the igniter assembly 1, and the opposing portion 43 is also inclined downward toward this inside. Note that the bottom surface portion 60c or the opposing portion 43 may not be inclined downward, and for example, may be formed into a plane shape orthogonal to the axial direction of the igniter assembly 1. It is preferable that the shape of the bottom surface portion 60c and the shape of the opposing portion 43 match each other in this manner.

The peripheral wall portion 42 is formed in a manner such that the diameter of this portion is slightly less than the inner diameter of the central portion 60b to a degree that the central portion 60b fits into the peripheral wall portion 42. When the igniter 2 is fitted into the igniter collar 6 from the opening 62 side, the peripheral wall portion 42 is inserted into the central portion 60b while being guided by the central portion 60b. Note that the peripheral wall portion 42 and the central portion 60b may be formed into a tapered shape in which the diameter on the lower side gradually decreases. This makes it easy to insert the peripheral wall portion 42 into the central portion 60b, and also makes it possible to firmly fix the holding portion 4 to the igniter collar 6 after the tip end portion 60c is crimped. In this manner, the fixing portion 60 surrounds a portion of the inclined portion 41, the peripheral wall portion 42, and the opposing portion 43 to fix the holding portion 4.

In addition, the holding portion 4 further includes a lower portion 45 disposed at the lowermost portion. The pair of electro-conductive pins 5 are exposed from the lower end portion of the lower portion 45, and extend downward. Furthermore, the lower portion 45 has a diameter slightly less than the opening 63 of the igniter collar 6, and is fitted into the opening 63.

In addition, the holding portion 4 includes protrusion portions 44a and 44b formed continuously around a periphery of the holding portion 4 and formed integrally with the holding portion 4. In the present embodiment, the protrusion portion 44a, corresponding to, for example, "first protrusion portion", and the protrusion portion 44b (for example, corresponding to a "second protrusion portion") are formed in the opposing portion 43 concentrically with respect to the center axis of the ignition portion 3. The protrusion portions 44a and 44b protrude from the front surface, which is the front surface of the opposing portion 43 in the present embodiment, of the holding portion 4, and are press-attached to the fixing portion 60, specifically the bottom surface portion 60c in the present embodiment, in a state where the holding portion 4 is fixed to the fixing portion 60. Note that the protrusion portion may be formed only on any one of the inclined portion 41, the peripheral wall portion 42, and the opposing portion 43. A plurality of protrusion portions may be formed on one portion. A plurality of protrusion portions may be formed separately on the inclined portion 41, the peripheral wall portion 42, and the opposing portion 43, or protrusion portion may be formed only on any one of the inclined portion 41, the peripheral wall portion 42, and the opposing portion 43.

The igniter 2 is attached to the igniter collar 6 in the following mode. Here, operation and effect obtained by providing the protrusion portions 44a and 44b will be described. In the igniter assembly 1, it is important to secure the sealing property between the igniter 2 and the igniter collar 6. Generally, if a gap exists between the igniter and the igniter collar, moisture enters, through the gap, the inside of a device where the igniter assembly is disposed. This moisture is likely to have an impact on an explosive or the like within the device. If the moisture has an impact on the explosive, the device may not work properly. For this reason, in a case of the igniter assembly 1 according to the present embodiment, the protrusion portions 44a and 44b are caused to be press-attached to the fixing portion 60 to improve the sealing property between the igniter 2 and the igniter collar 6, which makes it possible to prevent moisture from entering from the outside. Note that, in a state where the holding portion 4 is fixed to the fixing portion 60, the protrusion portions 44a and 44b are pressed against the bottom surface portion 60c to be deformed, and are in close contact with the bottom surface portion. This makes it possible to further improve the sealing property between the igniter 2 and the igniter collar 6.

Furthermore, since the protrusion portions 44a and 44b are made of resin and formed integrally with the holding portion 4, the sealing property of the igniter assembly 1 can be improved without using a gasket or other seal members. In addition, if the holding portion 4 is detached temporarily from the fixing portion 60 due to necessity of redoing the process of fixing the holding portion 4 of the igniter 2 to the fixing portion 60 of the igniter collar 6, the protrusion portions 44a and 44b can be press-attached to the fixing portion 60 again at the time of re-attaching the holding portion 4 to the fixing portion 60 again. Thus, even if this process is redone, the sealing property in the igniter assembly 1 can be secured. In this manner, with the igniter assembly 1 according to the present embodiment, the sealing property can be improved without increasing the number of parts while making it easy to perform assembly.

From the viewpoint of maintaining the air-tightness, it is preferable that the protrusion portions 44a and 44b are protrusions continuing in the circumferential direction. Note that, even in a case where the protrusion portions 44a and 44b are formed as a plurality of protrusions discontinuing in the circumferential direction, a gap that allows protrusions adjacent in the circumferential direction to be substantially connected to each other as a result of deformation may be formed, in a state where the protrusion portions are press-attached to the fixing portion 60.

Figure 3:
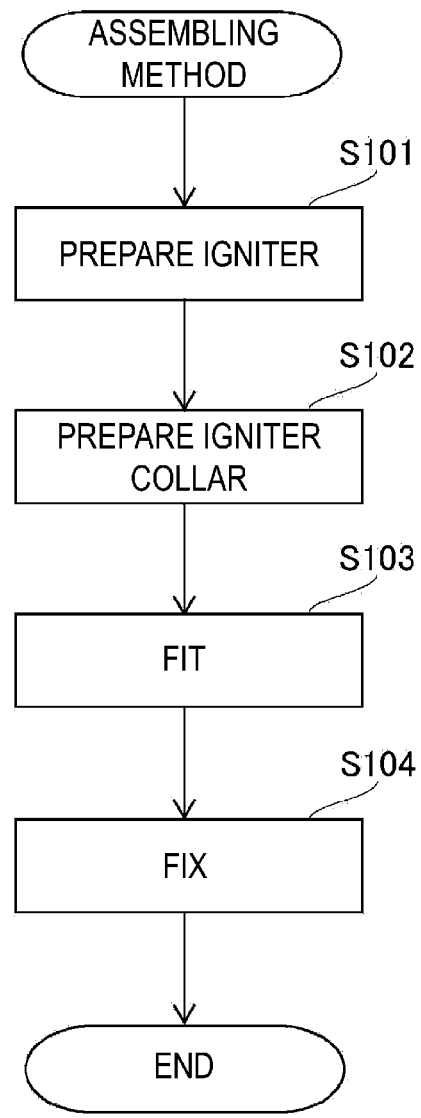
FIG. 3 is a flowchart concerning a method for assembling an igniter assembly according to the first embodiment.
Figure 4:
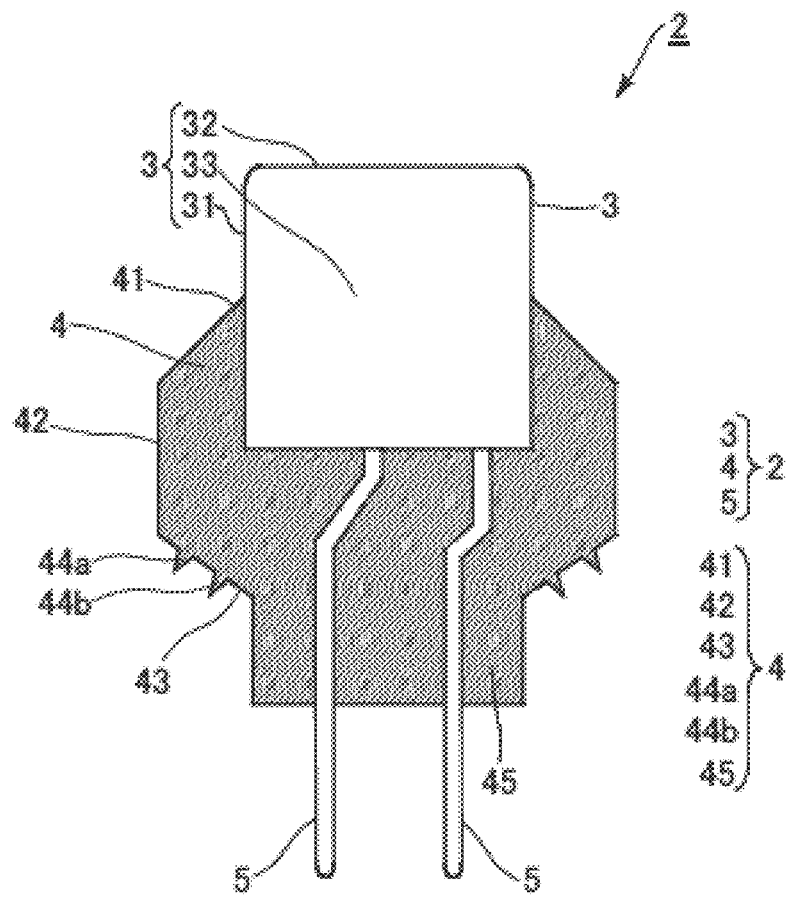
FIG. 4 is a diagram illustrating a schematic configuration of an igniter of the igniter assembly according to the first embodiment.
Figure 5:
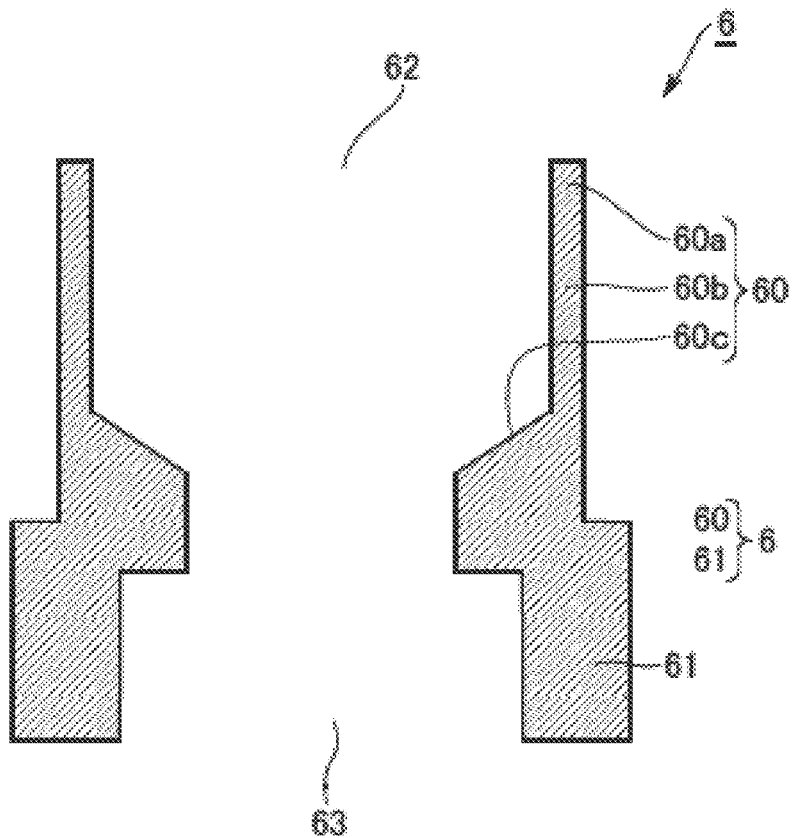
FIG. 5 is a diagram illustrating a schematic configuration of an igniter collar of the igniter assembly according to the first embodiment.

Next, with reference to FIGS. 3 to 5, a method for assembling an igniter assembly (hereinafter, simply referred to as an "assembling method") according to the present embodiment will be described. FIG. 3 is a flowchart of the assembling method according to the present embodiment. In the assembling method according to the present embodiment, the igniter 2 is first prepared as illustrated in FIG. 3 (step S101). FIG. 4 is an axial cross-sectional view of the igniter 2. Before the protrusion portions 44a and 44b of the igniter 2 according to the present embodiment are press-attached to the fixing portion 60 to be deformed, the cross-sectional shape of the protrusion portions 44a, 44b is an isosceles triangle in a protruding direction from the front surface of the opposing portion 43 of the holding portion 4. Note that the cross-sectional shape of the protrusion portions 44a, 44b is not limited to this, and may be other polygonal shapes or a semicircular shape.

Next, the igniter collar 6 is prepared as illustrated in FIG. 3 (step S102). FIG. 5 is an axial cross-sectional view of the igniter collar 6. Before the igniter 2 is attached, the tip end portion 60a of the fixing portion 60 is not bent toward the inner side, and straightly extends upward from the central portion 60b. Note that either the process of preparing the igniter 2 (step S101) or the process of preparing the igniter collar 6 (step S102) may be performed first or these processes may be performed at the same time.

Next, the igniter 2 is fitted into the igniter collar 6 as illustrated in FIG. 3 (step S103). Specifically, the igniter 2 is inserted into the opening 62 of the igniter collar 6 from the lower portion 45 side to cause the igniter 2 to fit in the igniter collar 6 until the protrusion portions 44a and 44b formed on the opposing portion 43 are brought into contact with the bottom surface portion 60c. Next, the igniter 2 is fixed to the igniter collar 6 (step S104). Specifically, in a state where the protrusion portions 44a and 44b are press-attached to the bottom surface portion 60c of the fixing portion 60, the tip end portion 60a is crimped against the inclined portion 41 to fix the holding portion 4 to the fixing portion 60. This makes it possible to attach the igniter 2 to the igniter collar 6. Note that, in the process of fixing the holding portion 4 to the fixing portion 60 (step S104), the protrusion portion 44a is pressed against the bottom surface portion 60c of the fixing portion 60 and is deformed to be brought into contact therewith. This enables the igniter assembly 1 according to the present embodiment to further improve the sealing property between the igniter 2 and the igniter collar 6. Note that the tip end portion 60a may be crimped, whereby the protrusion portions 44a and 44b are press-attached to the bottom surface portion 60c and deformed. That is, in step S104, deforming and press-attaching of the protrusion portions 44a and 44b as well as crimping of the tip end portion 60a can be performed at the same time.

First Modified Example

Figure 6:
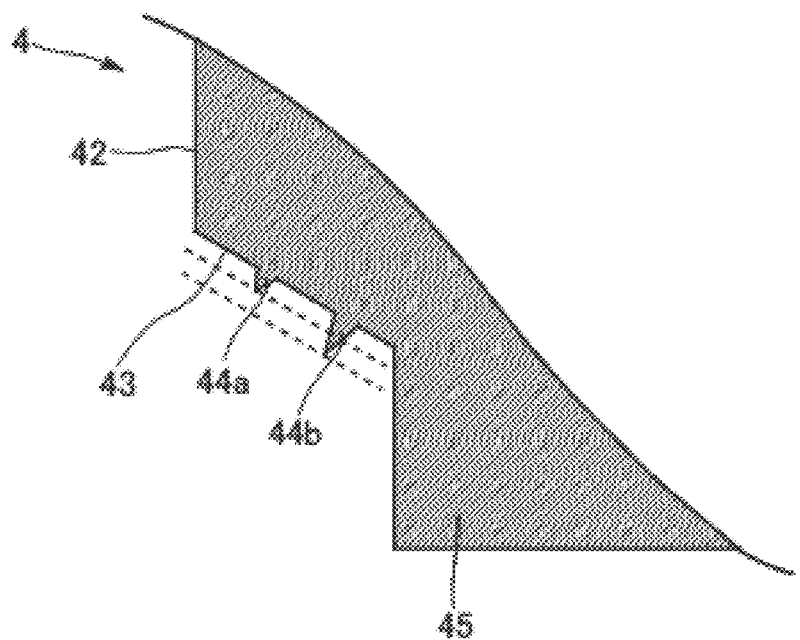
FIG. 6 is a diagram illustrating a schematic configuration of an igniter assembly according to a first modified example of the first embodiment.

Next, a modified example 1 according to the present embodiment will be described with reference to FIG. 6. An igniter assembly 1 according to the present modified example is characterized by the heights of the protrusion portions 44a and 44b. FIG. 6 is an enlarged diagram in which only the holding portion 4 at and around the opposing portion 43 of the holding portion 4 is taken from the axial cross section of the igniter 2 according to the present modified example. In the present modified example, the protrusion portion 44a and the protrusion portion 44b are formed concentrically with respect to the center axis of the ignition portion 3 and have different heights protruding from the opposing portion 43 of the holding portion 4. For example, the protrusion portion 44b corresponding to a "second protrusion portion" is formed at a height greater than the protrusion portion 44a (corresponding to a "first protrusion portion") from the opposing portion 43, as illustrated in FIG. 6.

By forming the protrusion portions 44a and 44b in this manner, at the time of fixing the holding portion 4 to the fixing portion 60 for the first time, the lower protrusion portion 44a is not brought into contact with the bottom surface portion 60c or only the tip end thereof is brought into contact with the bottom surface portion 60c while the higher protrusion portion 44b is press-attached to the bottom surface portion 60c and is deformed in a crushed manner, even in a case where a process of fixing the holding portion 4 of the igniter 2 to the fixing portion 60 of the igniter collar 6 needs to be redone. This makes it possible to prevent the lower protrusion portion 44a from being deformed in a completely crushed manner. Thus, when the holding portion is fixed to the fixing portion again, the protrusion portion 44a that has not yet been deformed can be reliably press-attached to the bottom surface portion 60c and be deformed. With this configuration, the sealing property of the igniter assembly 1 according to the present modified example can be secured even if the process of fixing the holding portion 4 to the fixing portion 60 is redone. In this manner, the igniter assembly 1 according to the present modified example can be reassembled and the sealing property can be improved.

Second Modified Example

Figure 7:
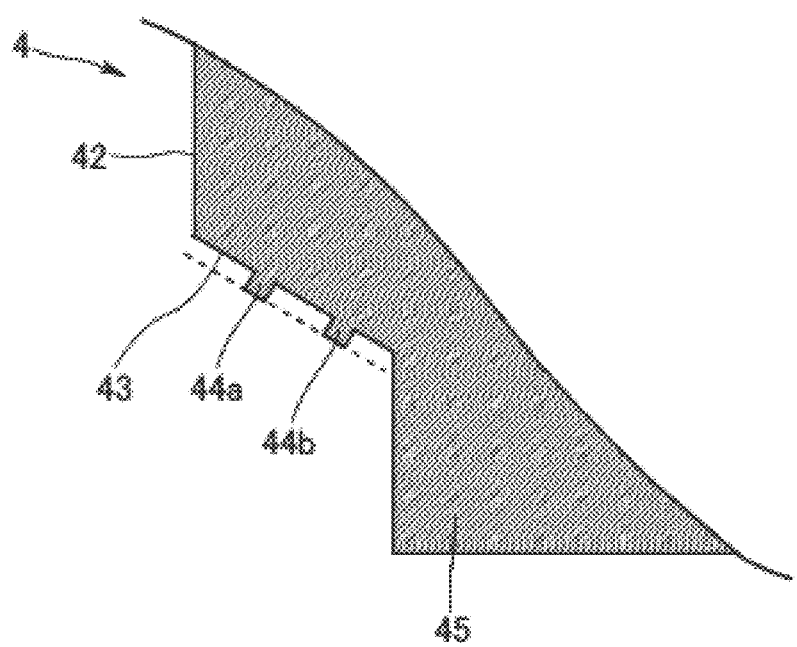
FIG. 7 is a diagram (No. 1) illustrating a schematic configuration of an igniter assembly according to a second modified example of the first embodiment.
Figure 8:
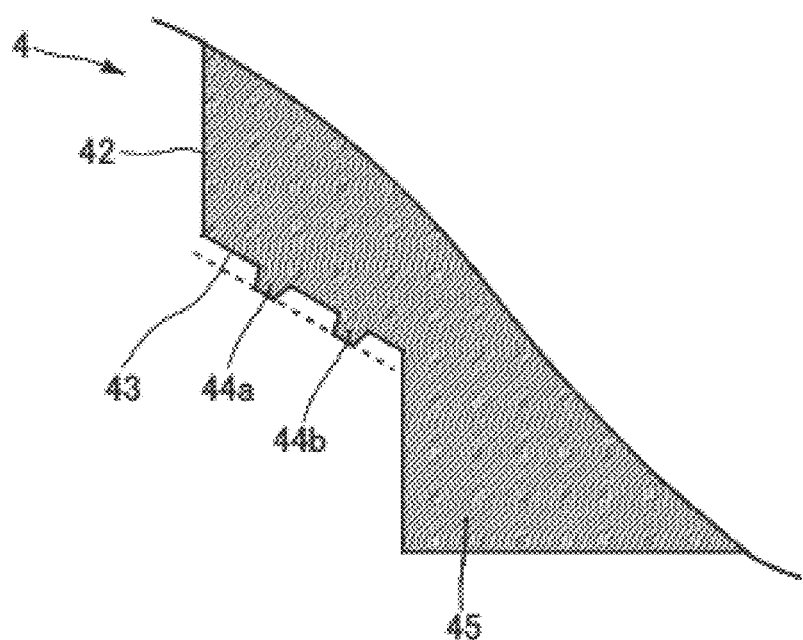
FIG. 8 is a diagram (No. 2) illustrating a schematic configuration of the igniter assembly according to the second modified example of the first embodiment.
Figure 9:
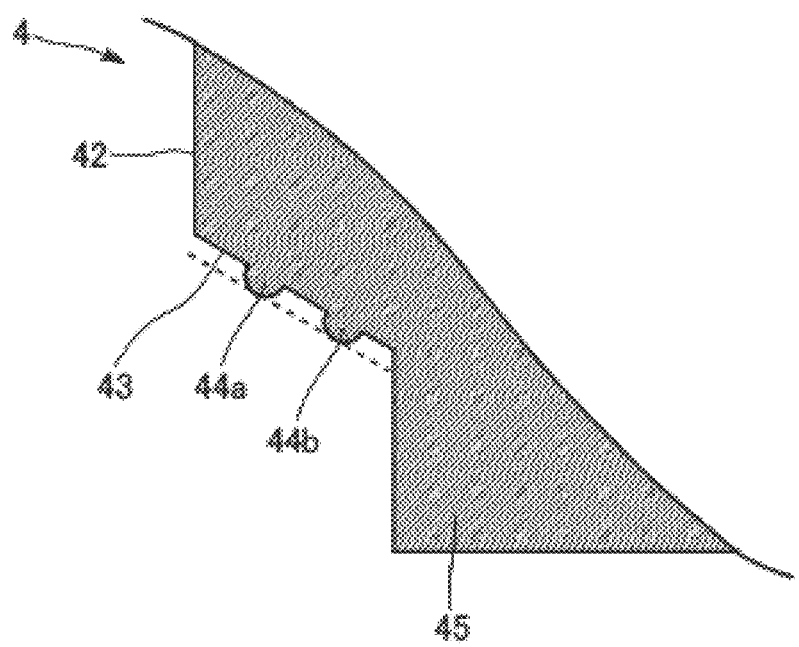
FIG. 9 is a diagram (No. 3) illustrating a schematic configuration of the igniter assembly according to the second modified example of the first embodiment.

Next, a modified example 2 according to the present embodiment will be described with reference to FIGS. 7 to 9. An igniter assembly 1 according to the present modified example is characterized by the cross-sectional shape of the protrusion portions 44a and 44b. FIGS. 7 to 9 are enlarged diagrams in which only the holding portion 4 at and around the opposing portion 43 of the holding portion 4 is taken from the axial cross section of the igniter 2 according to the present modified example. In the example illustrated in FIG. 7, the cross-sectional shape of the protrusion portions 44a, 44b is a rectangle shape in a protruding direction from the front surface of the opposing portion 43 of the holding portion 4. In the example illustrated in FIG. 8, the cross-sectional shape of the protrusion portions 44a, 44b is a trapezoid shape, (for example, an isosceles trapezoid shape), in a protruding direction from the front surface of the opposing portion 43 of the holding portion 4. In the example illustrated in FIG. 9, the cross-sectional shape of the protrusion portions 44a, 44b is a semicircle shape in a protruding direction from the front surface of the opposing portion 43 of the holding portion 4. In this manner, the cross-sectional shape of the protrusion portions 44a, 44b may be a rectangle shape, a trapezoid shape, or a semicircular shape, or may be a combination of these shapes. The protrusion portions 44a and 44b according to the present modified example illustrated in FIGS. 7 to 9 each have a width in the cross-sectional shape, greater than a height of protrusion from the front surface of the opposing portion 43. Here, the width in the cross-sectional shape is a width in a direction orthogonal to a protruding direction from the front surface of the opposing portion 43. In this manner, the cross-sectional shape of the protrusion portions 44a, 44b is a rectangle shape, a trapezoid shape, or a semicircular shape and the width of the cross-sectional shape is greater than the height of protrusion from the front surface of the holding portion 4.

Thus, the protrusion portions 44a, 44b can be prevented from being deformed in a case where these portions are brought into contact with a jig or other parts during the assembly process. This makes it possible to prevent deformation of the protrusion portions 44a and 44b in a state prior to insertion, and to cause the protrusion portions 44a and 44b to be press-attached to the fixing portion 60 as designed at the time of fixing the holding portion 4 to the fixing portion 60 or after the fixing. With the igniter assembly 1 according to the present modified example, the sealing property can be improved while facilitating the assembly process.

Third Modified Example

Figure 10:
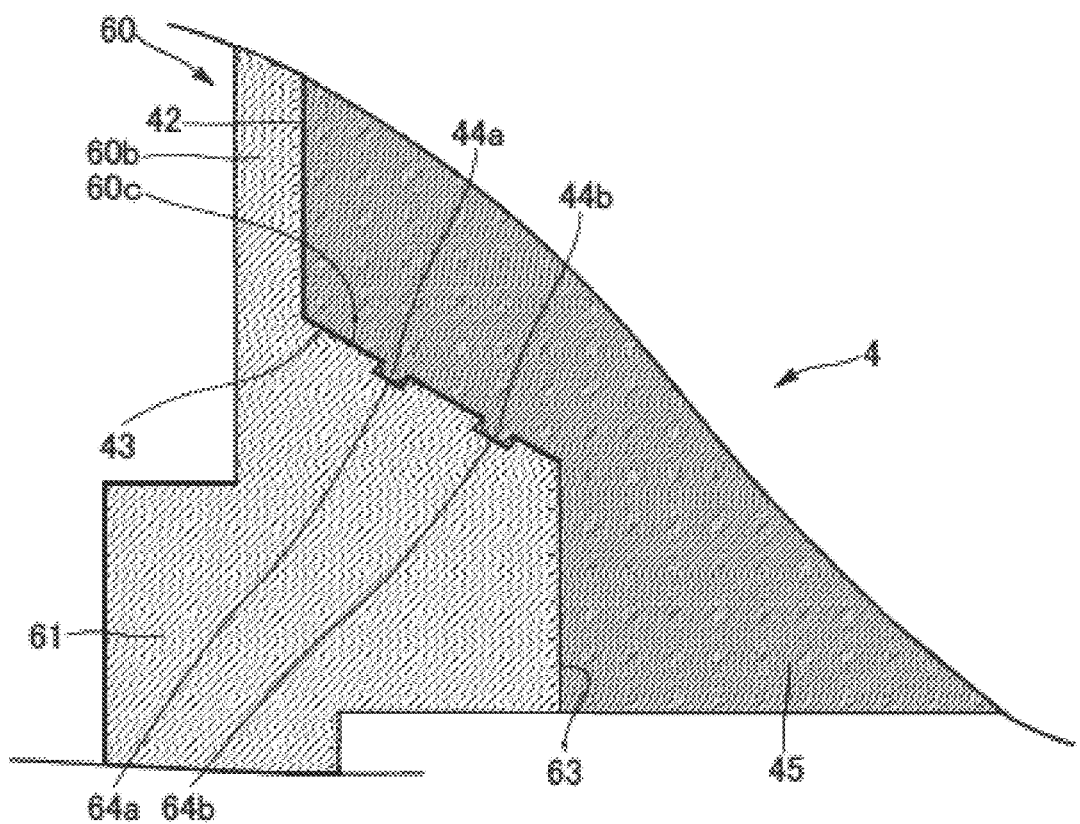
FIG. 10 is a diagram (No. 1) illustrating a schematic configuration of an igniter assembly according to a third modified example of the first embodiment.
Figure 11:
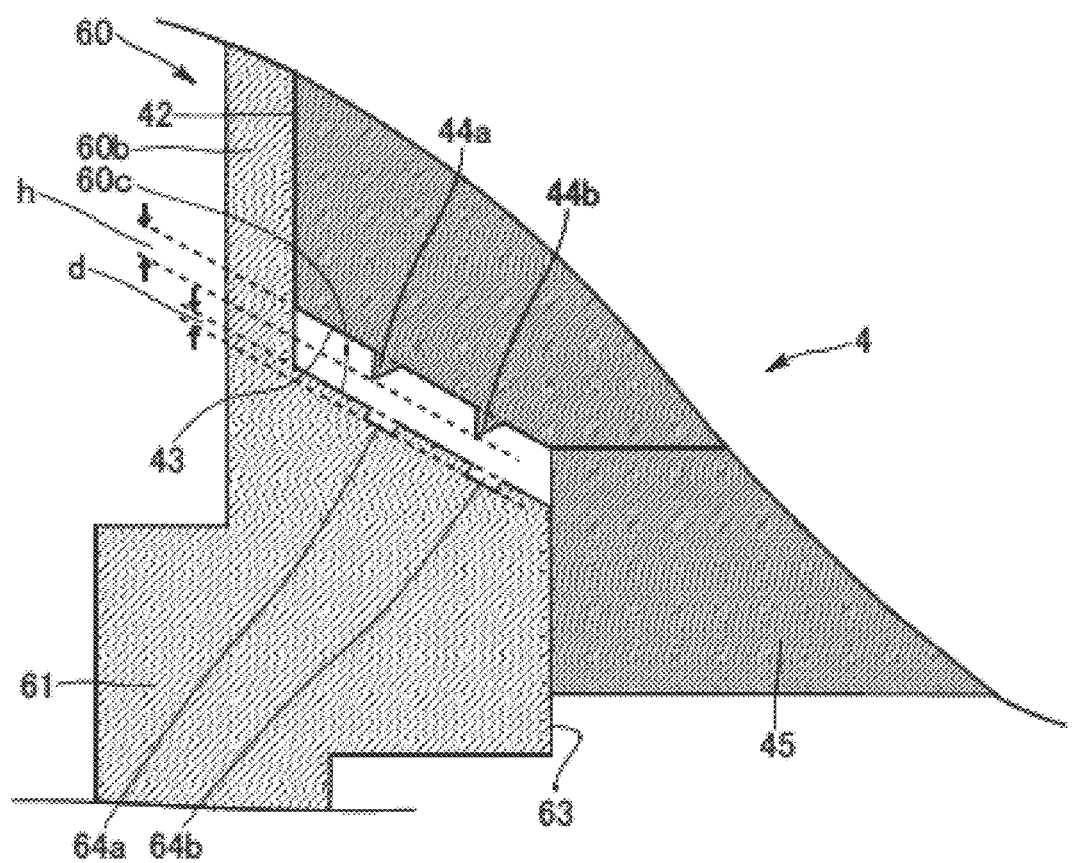
FIG. 11 is a diagram (No. 2) illustrating a schematic configuration of an igniter assembly according to the third modified example of the first embodiment.

Next, a modified example 3 according to the present embodiment will be described with reference to FIGS. 10 and 11. An igniter assembly 1 according to the present modified example is characterized in that the fixing portion 60 includes groove portions 64a and 64b. FIGS. 10 and 11 are enlarged diagrams in which the opposing portion 43 of the holding portion 4 and its surroundings are taken from the axial cross section of the igniter 2 according to the present modified example.

As illustrated in FIG. 10, in the present modified example, the fixing portion 60 includes the groove portions 64a and 64b formed at positions corresponding to the protrusion portions 44a and 44b. For example, the cross-sectional shape of the groove portions 64a, 64b in the axial direction of the fixing portion 60 is a rectangle shape. In a case where the protrusion portions 44a, 44b are press-attached to the fixing portion 60, the protrusion portions 44a, 44b are fitted into the groove portion 64a, 64b and are deformed into a shape corresponding to a shape of the groove portions 64a, 64b. FIG. 11 is a cross-sectional view illustrating a state where the holding portion 4 is being fitted into the fixing portion 60 and before the protrusion portions 44a, 44b are brought into contact with the bottom surface portion 60c. The groove portions 64a, 64b are formed to have a depth (d) shorter than a height (h) of the protrusion portion 44a protruding from the front surface, specifically the front surface of the opposing portion 43 in the present modified example, of the holding portion 4. In the present modified example, a relationship of d<h/2 is satisfied. That is, the depth of the groove portions 64a, 64b is shorter than a half of the height of the protrusion portions 44a, 44b. In the process of fixing the holding portion 4 to the fixing portion 60, the protrusion portions 44a, 44b are pressed against the bottom of the groove portions 64a, 64b as illustrated in FIG. 10. This causes the protrusion portions 44a, 44b to be fitted into the groove portions 64a, 64b, and thus deformed into a shape corresponding to the shape of the groove portions 64a, 64b. This makes it possible to further improve the sealing property between the igniter 2 and the igniter collar 6. Note that the relationship between the depth (d) of the groove portions 64a, 64b and the protrusion portions 44a, 44b is a relationship of a state illustrated in FIG. 11. That is, the groove portions 64a, 64b can be filled with the deformed protrusion portions 44a, 44b. Thus, the relationship between the height (h) and the depth (d) can be appropriately changed depending on the cross-sectional shape of the groove portions 64a, 64b, the cross-sectional shape of the protrusion portions 44a, 44b, and the relative dimensions of these portions.

Second Embodiment

Figure 12:
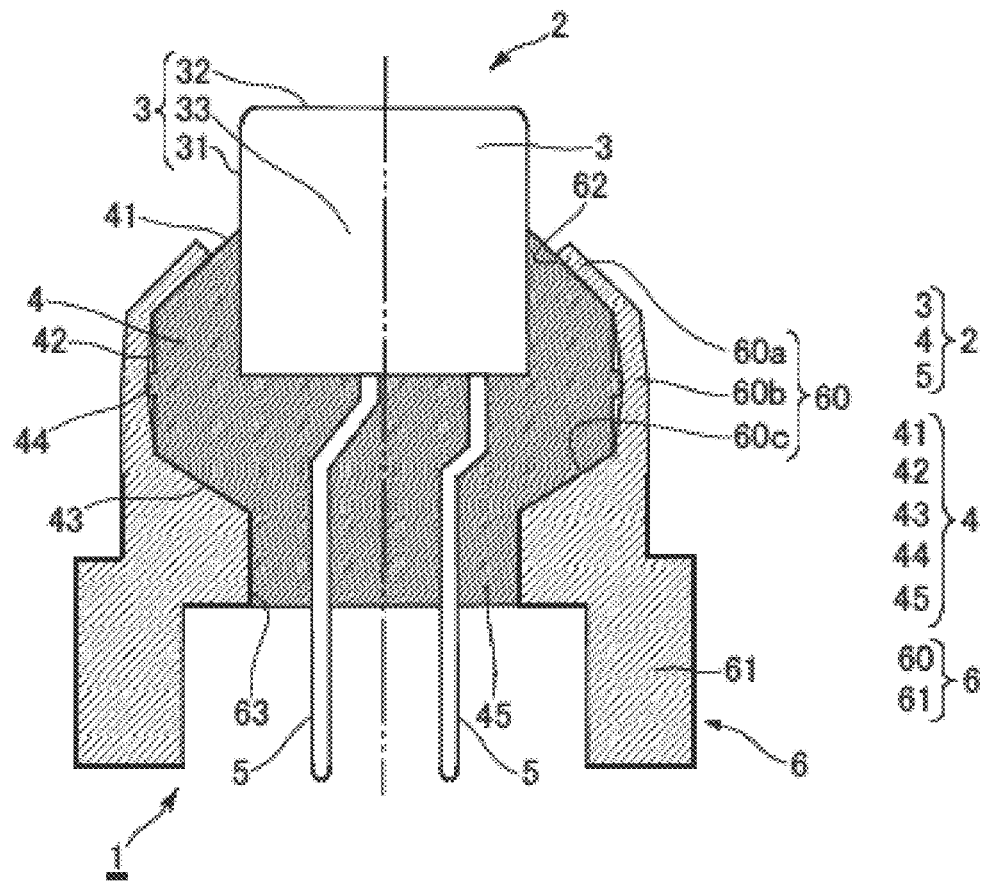
FIG. 12 is a diagram illustrating a schematic configuration of an igniter assembly according to a second embodiment.

Next, an igniter assembly 1 according to a second embodiment will be described with reference to FIGS. 12 and 13. FIG. 12 is an axial cross-sectional view of the igniter assembly 1 according to the present embodiment. Note that, in FIGS. 12 and 13, the same reference characters are attached to substantially the same configurations as those in the first embodiment described above, and explanation thereof is omitted.

The igniter assembly 1 according to the present embodiment includes one protrusion portion 44, and is characterized in that the protrusion portion 44 is formed on the peripheral wall portion 42 of the holding portion 4. The protrusion portion 44 may be formed on any of the inclined portion 41, the peripheral wall portion 42, or the opposing portion 43, as long as the protrusion portion 44 can be press-attached to the fixing portion 60. In addition, for example, the protrusion portion may be formed on each of the inclined portion 41, the peripheral wall portion 42, and the opposing portion 43. In the present embodiment, the protrusion portion 44 is also press-attached at the central portion of the fixing portion 60 in the center axis direction, in a state where the holding portion 4 is fixed to the fixing portion 60. This makes it possible to improve the sealing property between the igniter 2 and the igniter collar 6 in the igniter assembly 1 according to the present embodiment.

Figure 13:
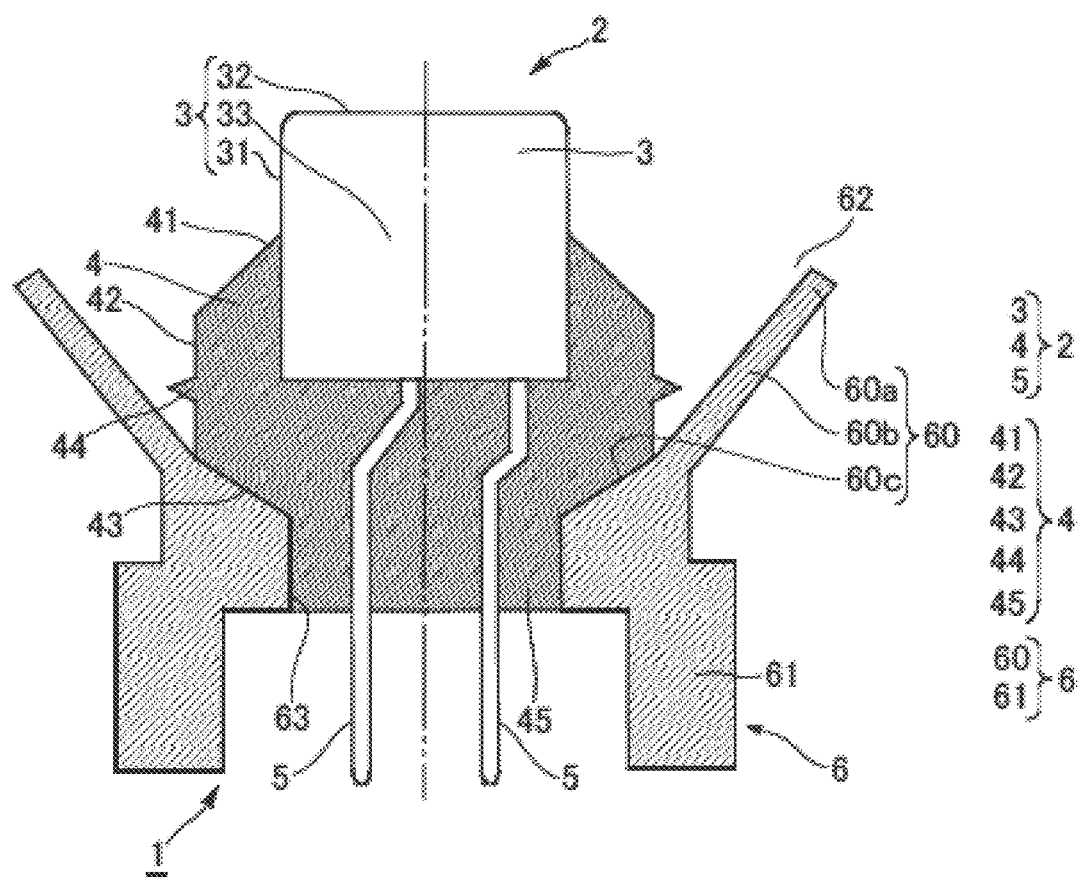
FIG. 13 is a diagram illustrating a method for assembling an igniter assembly according to the second embodiment.

In a case where the protrusion portion 44 is formed on the peripheral wall portion 42 as in the present embodiment, an igniter collar 6 having a shape in which the diameter of the fixing portion 60 increases toward the tip end portion 60*a* is prepared as illustrated in FIG. 13. FIG. 13 is a cross-sectional view illustrating a state after the igniter 2 is fitted into the fixing portion 60 and before the process of fixing the holding portion 4 to the fixing portion 60 is performed. Before the tip end portion 60*a* is bent toward the inner side, the fixing portion 60 expands toward the tip end portion 60*a*. A so-called roll-crimping method can be used in a case where the tip end portion 60*a* is crimped to the inclined portion 41 in this manner. The roll-crimping method is a processing method in which a rod-shaped jig having a roller at the tip end and roller is pressed against the entire periphery of the outer periphery of the tip end portion 60*a* to bend the tip end portion 60*a* toward the inner side to crimp it. By bending the tip end portion 60*a* toward the inner side using the roll-crimping method, the holding portion 4 is fixed to the fixing portion 60 in a state where the protrusion portion 44 is press-attached to the central portion 60*b* of the fixing portion 60. At the time of performing this fixing process (step S104), the protrusion portion 44 is pressed against the central portion 60*b* and is deformed to be air-tightly brought into close contact therewith. This makes it possible to improve the sealing property between the igniter 2 and the igniter collar 6 in the igniter assembly 1 according to the present embodiment.

Other Examples

The embodiments according to the present disclosure have been described. However, various embodiments described above can be combined if possible. For example, the peripheral wall portion 42 may include a plurality of protrusion portions. In this case, the heights of these protrusion portions may differ from each other, or a groove portion may be formed at a position corresponding to a protrusion portion of the central portion 60*b*.

Each embodiment disclosed in the present specification can be combined with each of the features disclosed in the present specification.

REFERENCE SIGNS LIST

1: Igniter assembly
2: Igniter
3: Ignition portion
4: Holding portion
5: Electro-conductive pin
6: Igniter collar
31: Tubular peripheral wall portion
32: Lid portion
33: Accommodating space
41: Inclined portion
42: Peripheral wall portion
43: Opposing portion
44, 44*a*, 44*b*: Protrusion portion
45: Lower portion
60: Fixing portion
60*a*: Tip end portion
60*b*: Central portion
60*c*: Bottom surface portion
61: Attachment portion
62, 63: Opening
64*a*, 64*b*: Groove portion
100: Gas generator
101: Upper shell
102: Lower shell
103 Housing
104 Gas release port
105 Gas generating agent
106: Filter
107: Flame transferring hole
108: Inner tubular member
109: Space
110: Combustion chamber
111: Transfer charge
112: Open end portion
113: Gap
114: Sealing tape
115: Under plate

The invention claimed is:

1. An igniter assembly, comprising:
an igniter of an electric ignition type including,
  an ignition portion including an igniting agent,
  a holding portion made of resin, covering at least a portion of a periphery of the ignition portion and holding the ignition portion, and
  an electro-conductive pin configured to energize the ignition portion; and
an igniter collar made of metal and to which the igniter is attached, wherein
the igniter collar includes a fixing portion surrounding the holding portion to fix the holding portion,
the holding portion includes a surrounded surface surrounded by the fixing portion, the holding portion includes a protrusion portion protruding from the surrounded surface toward the fixing portion and formed continuously around a periphery thereof and formed integrally with the holding portion, wherein the protrusion portion has a deformed rib shape protruding from a contour of the surrounded surface, and
the protrusion portion is press-attached to the fixing portion in a state where the holding portion is fixed to the fixing portion.

2. The igniter assembly according to claim 1, wherein
in the state where the holding portion is fixed to the fixing portion, the protrusion portion is pressed against the fixing portion and deformed in a direction along a height of the rib shape to be air-tightly brought into close contact with the fixing portion.

3. The igniter assembly according to claim 2, wherein
the ignition portion includes, a tubular peripheral wall portion,
a lid portion closing one end of the tubular peripheral wall portion, and
an accommodating space formed with the tubular peripheral wall portion and the lid portion and accommodating therein the igniting agent,
the lid portion is disposed in a manner such that the lid portion is located at a side toward which a combustion product of the igniting agent is discharged when the igniter is actuated,
the holding portion includes,
an inclined portion inclined downward of the igniter assembly and surrounding at least a portion of a periphery of the tubular peripheral wall portion and crimped at a tip end portion of the fixing portion,
an opposing portion opposed to a bottom surface portion of the fixing portion, and
a peripheral wall portion connecting the inclined portion and the opposing portion,
the protrusion portion is formed on at least any one of the inclined portion, the peripheral wall portion, or the opposing portion, and
the fixing portion surrounds at least a portion of the inclined portion, the peripheral wall portion, and the opposing portion to fix the holding portion.

4. The igniter assembly according to claim 2, wherein
a plurality of the protrusion portions are formed on the holding portion,
the plurality of the protrusion portions include a first protrusion portion and a second protrusion portion, and
the first protrusion portion and the second protrusion portion are formed concentrically with respect to a center axis of the ignition portion and have different heights protruding from the holding portion.

5. The igniter assembly according to claim 2, wherein
the fixing portion includes a groove portion formed at a position corresponding to the protrusion portion, and
in a case where the protrusion portion is press-attached to the fixing portion, the protrusion portion is fitted into the groove portion and is deformed into a shape corresponding to a shape of the groove portion.

6. The igniter assembly according to claim 1, wherein
the ignition portion includes,
a tubular peripheral wall portion,
a lid portion closing one end of the tubular peripheral wall portion, and
an accommodating space formed with the tubular peripheral wall portion and the lid portion and accommodating therein the igniting agent,
the lid portion is disposed in a manner such that the lid portion is located at a side toward which a combustion product of the igniting agent is discharged when the igniter is actuated,
the holding portion includes,
an inclined portion inclined downward of the igniter assembly and surrounding at least a portion of a periphery of the tubular peripheral wall portion and crimped at a tip end portion of the fixing portion,
an opposing portion opposed to a bottom surface portion of the fixing portion, and
a peripheral wall portion connecting the inclined portion and the opposing portion,
the protrusion portion is formed on at least any one of the inclined portion, the peripheral wall portion, or the opposing portion, and
the fixing portion surrounds at least a portion of the inclined portion, the peripheral wall portion, and the opposing portion to fix the holding portion.

7. The igniter assembly according to claim 6, wherein
a plurality of the protrusion portions are formed on the holding portion,
the plurality of the protrusion portions include a first protrusion portion and a second protrusion portion, and
the first protrusion portion and the second protrusion portion are formed concentrically with respect to a center axis of the ignition portion and have different heights protruding from the holding portion.

8. The igniter assembly according to claim 6, wherein
the fixing portion includes a groove portion formed at a position corresponding to the protrusion portion, and
in a case where the protrusion portion is press-attached to the fixing portion, the protrusion portion is fitted into the groove portion and is deformed into a shape corresponding to a shape of the groove portion.

9. The igniter assembly according to claim 1, wherein
a plurality of the protrusion portions are formed on the holding portion,
the plurality of the protrusion portions include a first protrusion portion and a second protrusion portion, and
the first protrusion portion and the second protrusion portion are formed concentrically with respect to a center axis of the ignition portion and have different heights protruding from the holding portion.

10. The igniter assembly according to claim 9, wherein
the fixing portion includes a groove portion formed at a position corresponding to the protrusion portion, and
in a case where the protrusion portion is press-attached to the fixing portion, the protrusion portion is fitted into the groove portion and is deformed into a shape corresponding to a shape of the groove portion.

11. The igniter assembly according to claim 9, wherein
the second protrusion portion is provided radially inward of the first protrusion portion with respect to the center axis of the ignition portion, and
the second protrusion portion has a higher height protruding from the holding portion than the first protrusion portion.

12. The igniter assembly according to claim 1, wherein
a cross-sectional shape of the protrusion portion in a protruding direction from a surface of the holding portion is a rectangle shape, a trapezoid shape, or a semicircular shape, and a width of the cross-sectional shape is greater than a height of protrusion from a front surface.

13. The igniter assembly according to claim 1, wherein
the fixing portion includes a groove portion formed at a position corresponding to the protrusion portion, and
in a case where the protrusion portion is press-attached to the fixing portion, the protrusion portion is fitted into the groove portion and is deformed into a shape corresponding to a shape of the groove portion.

14. The igniter assembly according to claim 1, wherein
the protrusion portion is formed as a plurality of protrusions discontinuing in a circumferential direction of the holding portion before the plurality of protrusions are press-attached to the fixing portion, a protrusion is connected to an adjacent protrusion in the circumferential direction by deformation of the protrusion and the adjacent protrusion, in a state where the plurality of protrusions are press-attached to the fixing portion.

15. A gas generator, comprising:
the igniter assembly according to claim 1.

16. A method for assembling an igniter assembly in which an igniter of an electric ignition type is attached to an igniter collar made of metal, the method comprising:

preparing the igniter including,
an ignition portion including an igniting agent,
a holding portion made of resin, covering at least a portion of a periphery of the ignition portion and holding the ignition portion, and
an electro-conductive pin configured to energize the ignition portion; and preparing the igniter collar including a fixing portion surrounding the holding portion to fix the holding portion, wherein the holding portion includes a rib-shaped protrusion portion formed continuously around a periphery thereof and formed integrally with the holding portion, and the method for assembling the igniter assembly further includes inserting the igniter into the igniter collar, pressing the rib-shaped protrusion portion against an inner surface of the igniter collar, and fixing the holding portion to the fixing portion in a state where the protrusion portion is press-attached to the fixing portion and deformed to be air-tight.

17. The method for assembling an igniter assembly according to claim 16, wherein
the rib-shaped protrusion portion is pressed against the fixing portion and deformed in a direction along a height of the rib-shaped protrusion portion to be airtightly brought into close contact with the fixing portion, in the fixing the holding portion to the fixing portion.

* * * * *